US008194185B2

(12) United States Patent
Kervec et al.

(10) Patent No.: US 8,194,185 B2
(45) Date of Patent: Jun. 5, 2012

(54) VIDEO PICTURE DISPLAY METHOD TO REDUCE THE EFFECTS OF BLURRING AND DOUBLE CONTOURS AND DEVICE IMPLEMENTING THIS METHOD

(75) Inventors: Jonathan Kervec, Paimpont (FR); Hassane Guermoud, Pont Pean (FR); Didier Doyen, La Bouexière (FR)

(73) Assignee: Thomson Licensing, Boulogne-Billancourt (FR)

( * ) Notice: Subject to any disclaimer, the term of this patent is extended or adjusted under 35 U.S.C. 154(b) by 580 days.

(21) Appl. No.: 12/316,062

(22) Filed: Dec. 9, 2008

(65) Prior Publication Data

US 2009/0161018 A1 Jun. 25, 2009

(30) Foreign Application Priority Data

Dec. 20, 2007 (FR) ..................................... 07 60165

(51) Int. Cl.
*H04N 7/01* (2006.01)
*H04N 11/20* (2006.01)
*H04N 5/21* (2006.01)

(52) U.S. Cl. ........ 348/447; 348/627; 348/241; 348/607; 348/620; 348/625; 348/606; 382/100; 382/275

(58) Field of Classification Search .................. 348/627, 348/607, 620, 625, 606, 241, 447; 382/100, 382/275
See application file for complete search history.

(56) References Cited

U.S. PATENT DOCUMENTS

| | | | | |
|---|---|---|---|---|
| 5,550,935 | A * | 8/1996 | Erdem et al. | 382/260 |
| 5,894,330 | A * | 4/1999 | Huang et al. | 348/447 |
| 6,421,097 | B1 * | 7/2002 | O'Rourke | 348/607 |
| 6,717,621 | B2 * | 4/2004 | O'Rourke | 348/607 |
| 7,133,075 | B2 * | 11/2006 | Ishida et al. | 348/312 |
| 2002/0131500 | A1 * | 9/2002 | Gandhi et al. | 375/240.16 |
| 2003/0147011 | A1 * | 8/2003 | Wischermann | 348/607 |
| 2004/0155847 | A1 | 8/2004 | Taoka | |
| 2005/0073616 | A1 * | 4/2005 | Joo et al. | 348/797 |
| 2007/0279531 | A1 | 12/2007 | Muto | |

FOREIGN PATENT DOCUMENTS

| | | |
|---|---|---|
| WO | WO2006/121188 | 11/2006 |
| WO | WO2007/116370 | 10/2007 |

* cited by examiner

*Primary Examiner* — Jefferey Harold
*Assistant Examiner* — Mustafizur Rahman
(74) *Attorney, Agent, or Firm* — Robert D. Shedd; Jeffrey M. Navon; Jerome G. Schaefer

(57) ABSTRACT

The present invention relates to a video picture display method that aims to reduce the effects of blurring and multiple contours when the picture display frequency is doubled. According to the invention, for each source video picture, a video level dissymmetry is created between the two pictures from the source video picture after doubling the frequency in the areas in motion of the source video picture.

7 Claims, 6 Drawing Sheets

Figure 1:
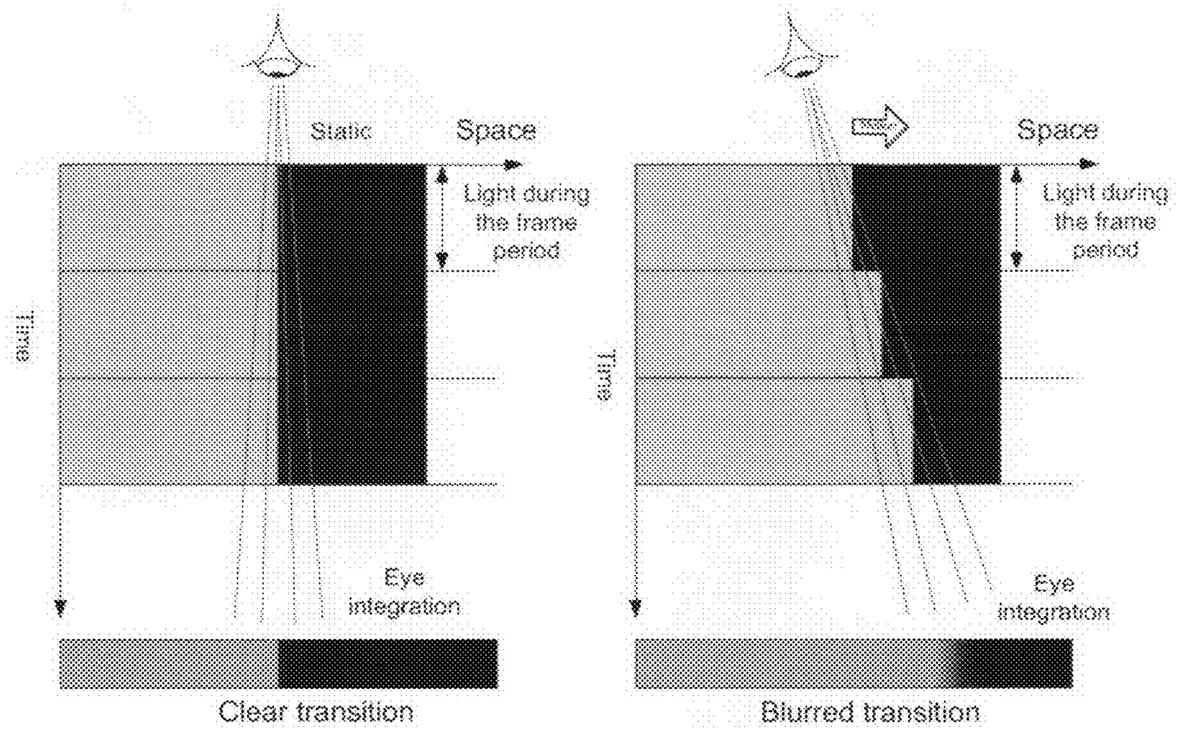
FIG.1 (Prior art)

VIDEO PICTURE DISPLAY METHOD TO REDUCE THE EFFECTS OF BLURRING AND DOUBLE CONTOURS AND DEVICE IMPLEMENTING THIS METHOD

This application claims the benefit, under 35 U.S.C. §119, of European Patent Application No. 0760165 of 20 Dec. 2007.

FIELD OF THE INVENTION

The present invention relates to a video picture display method that aims to reduce the effects of blurring and multiple contours when the picture display frequency is increased. The invention applies more particularly to display devices in which the light emitted is spread over time as for LCD (Liquid Crystal Display) screens, plasma screens, screens using DLP (Digital Light Processing) technology, or screens with 100 Hz cathode ray tubes.

TECHNOLOGICAL BACKGROUND OF THE INVENTION

Currently, display techniques developed for new screen types are optimised to reduce or eliminate flicker. The "100 Hz" concept or doubling of the scanning frequency first appeared on cathode ray tubes then liquid crystal monitors or screens became the reference for computer screens because of the almost complete absence of flicker due to their support type addressing mode. Current plasma screens with addressing by temporal modulation and picture repetition have, for the human eye, a behaviour close to that of 100 Hz cathode ray tube screens. All of these display techniques have enabled reduction of flicker to the detriment of the display of animated scenes. Of course there are motion compensation techniques but these are rarely used in television screens and their precision is not always sufficient to have an appreciable impact on displayed pictures. Moreover, for LCD screens, a reduction of their response time is too often presumed to be the solution to improve the quality of animated pictures and yet, even with a null response time, the LCD screen continues to produce a blur effect on objects in motion due to their support type addressing mode. Indeed multiple contours can also appear when the refresh frequency is increased, for example a double contour appears on objects when the screen refreshing frequency is 100 Hz. All of these effects of flicker, of blurring and of multiple contours are described in more detail in the following paragraphs.

The flicker effect and more particularly the "large area flicker" effect is linked to the refresh frequency and/or the screen addressing mode. The limit of perception of large area flicker by the human eye is approximately 60 Hz. If the refresh frequency is greater than this limit, the flicker effect is not or is hardly perceived by the human eye whatever the addressing type. Likewise, when there is support type addressing (as for LCDs), the flicker effect is not perceived. Therefore standard LCD screens (50 or 60 Hz addressing) do not introduce a flicker effect but do introduce a blur effect when the pictures comprise movements. In pulse type screens (such as cathode ray tube screens and plasma screens where the light is concentrated mainly on a reduced portion of the frame period) the flicker effect exists only if the refresh frequency is less than 60 Hz. Doubling of the refresh frequency (100 Hz or 120 Hz) eliminates this effect but introduces multiple contours on objects in motion in the pictures as illustrated further on.

The blur effect generally appears on the motion transitions in the picture. FIG. 1 illustrates this effect on a transition between a grey area and a black area in a picture displayed by an LCD screen (support type addressing). The left part of FIG. 1 illustrates the case where the transition is static on one or more successive video frames and the right part illustrates the case where the transition moves towards the right. In these two parts of the picture, the horizontal axis represents space and the vertical axis represents time. As can be seen on the left part of the figure, in the absence of motion, there is no blurring and the transition perceived by the eye is clear. In the right part of the figure, in the presence of motion, the eye follows the motion and integrates the light in the direction of the motion. A blurring effect then appears on the transition.

Figure 2:
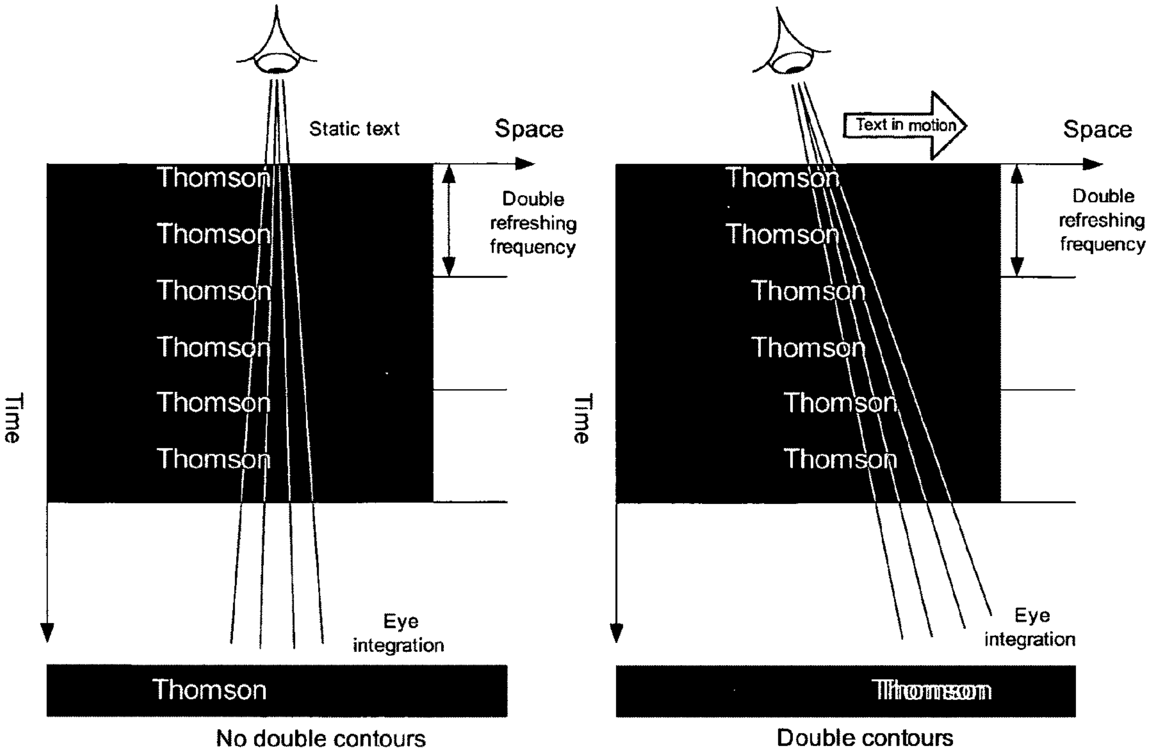
FIG.2 (Prior art)

Finally the "multiple contours" effect has the same causes as the blurring effect. However, this only appears on fine objects in motion such as text. As previously indicated, this effect appears when the refresh frequency is multiplied by n, n being greater than or equal to 2. FIG. 2 illustrates this effect for a picture displaying the word "Thomson" in grey on a black background. The refresh frequency of the screen displaying this text is doubled. The left part of FIG. 2 illustrates the case where the text is static on several successive video frames and the right part illustrates the case where the text moves towards the right. In these two parts of the picture, the horizontal axis represents space and the vertical axis represents time. As shown on the left part of the figure, in the absence of motion, there are no double contours. As shown on the right part of the figure, in the presence of motion, the eye follows the motion and integrates the light in the direction of the motion. A double contours effect appears on the word "Thomson".

Figure 3:
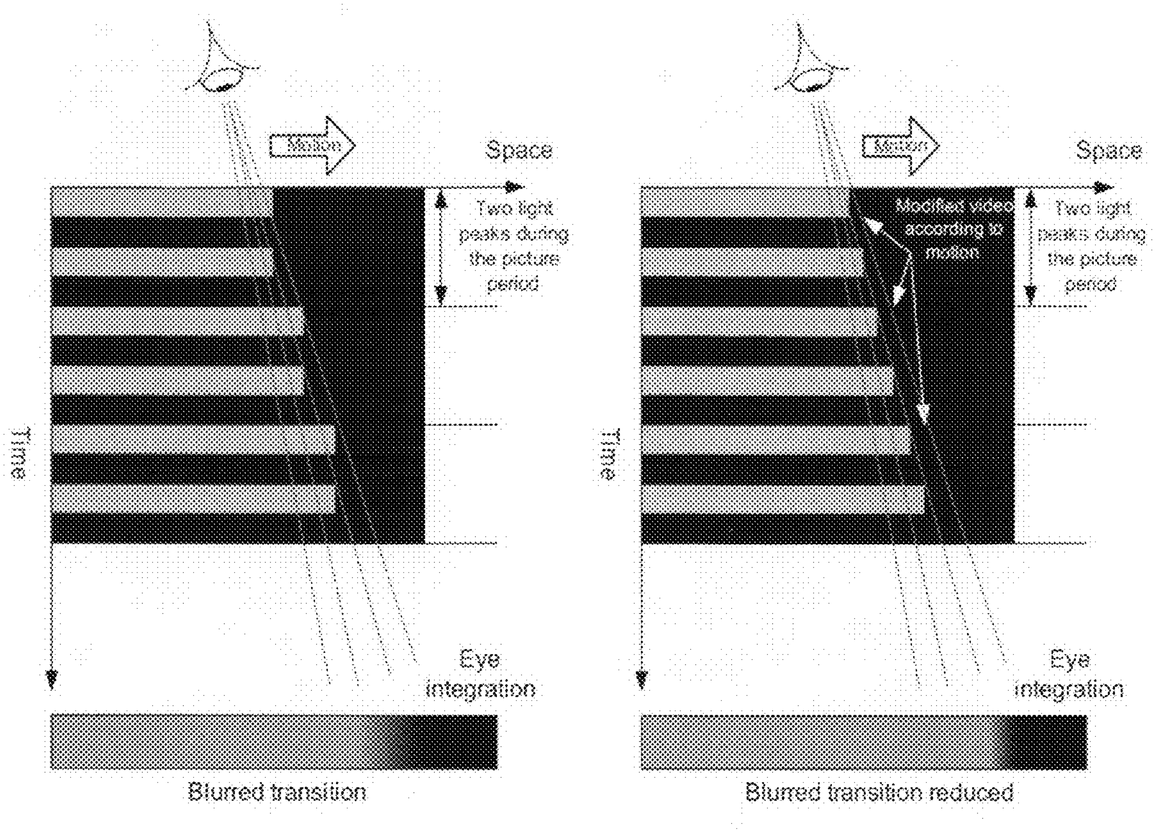
FIG.3 (Prior art)

To reduce these effects of blurring and of multiple contours, the use of motion compensation is known. This technique consists in modifying the video content, for example for one 100 Hz video picture in two, according to the motion detected. This technique is illustrated by FIG. 3 for a pulse type screen. FIG. 3 shows a transition between a grey area and a black area in a picture. The left part of FIG. 3 illustrates the case where the transition moves towards the right without motion compensation and the right part illustrates the case where the transition moves towards the right with motion compensation carried out in one 100 Hz picture in two. In the two parts of the figure, the horizontal axis represents space and the vertical axis represents time. As the left part of the figure shows, in the absence of compensation, there is blurring at the level of the transition perceived by the eye. Likewise, a double contour effect appears when text is displayed. As the right part of the figure shows, in the presence of compensation, the blurring effect disappears. The same is true for the double contours.

SUMMARY OF THE INVENTION

The present invention relates to a method intended to reduce the effects of blurring and double contours without using motion compensation.

The present invention relates to a method for displaying at least one source video picture from a video sequence, a source display frequency being associated with the source video picture. The method comprises the following steps:

- estimate the pixel motion of the source video picture,
- reproduce n times the source video picture in such a manner to generate n reproduced video pictures, n being an integer greater than or equal to 2.
- modify the n reproduced video pictures in such a manner as to generate, for at least one pixel of the source video picture having a non-null motion amplitude, a dissymmetry between the video level of this pixel in at least one first reproduced video picture and the video level of this pixel in at least one second reproduced video picture, the average video level of this pixel in the n reproduced video pictures being noticeably equal to the video level of this pixel in the source video picture, and the dissymmetry generated between the video level of this pixel in the first reproduced video picture and the video level of this pixel in the second reproduced video picture depending on the video level of this pixel in the source video picture and on the estimated motion for the considered pixel, and display the n reproduced video pictures with a display frequency equal to n times the display frequency associated with the source video picture.

According to a particular embodiment, to generate, for at least one pixel of the source video picture having a non-null amplitude of motion, a dissymmetry between the video level of this pixel in at least one first reproduced video picture and the video level of this pixel in at least one second reproduced video picture, a dissymmetry parameter is defined for this pixel from the estimated motion amplitude module for this pixel and the video level of this pixel is modified in said first and second reproduced video pictures based on the calculated dissymmetry parameter.

Advantageously, for a given pixel, the dissymmetry increases as the motion amplitude module estimated for the pixel increases.

The present invention also relates to a display device for at least one source video picture of a video sequence, a source display frequency being associated with the source video picture. The device comprises:

a motion estimator to estimate the pixel motion of said source video picture, a reproduction and processing circuit to reproduce n times the source video picture in such a manner as to generate n reproduced video pictures, n being an integer greater than or equal to 2 and to modify the n reproduced video pictures in such a manner as to generate, for at least one pixel of the source video picture having a non-null motion amplitude, a dissymmetry between the video level of this pixel in at least one first reproduced video picture and the video level of this pixel in at least one second reproduced video picture, the average video level of this pixel in the n reproduced video pictures being noticeably equal to the video level of said pixel in the source video picture, and the dissymmetry generated between the video level of this pixel in the first reproduced video picture and the video level of this pixel in the second reproduced video picture depending on the video level of this pixel in the source video picture and the estimated motion for the considered pixel, and a display to display the n reproduced video pictures with a display frequency equal to n times the display frequency associated with the source video picture.

According to a specific embodiment, the reproduction and processing circuit comprise a calculation circuit to calculate a dissymmetry parameter for the pixel considered from the estimated motion amplitude module for this pixel, the video level of said pixel in the first and second reproduced video pictures then being modified by the reproduction and processing circuit based on the calculated dissymmetry parameter.

Figure 4:
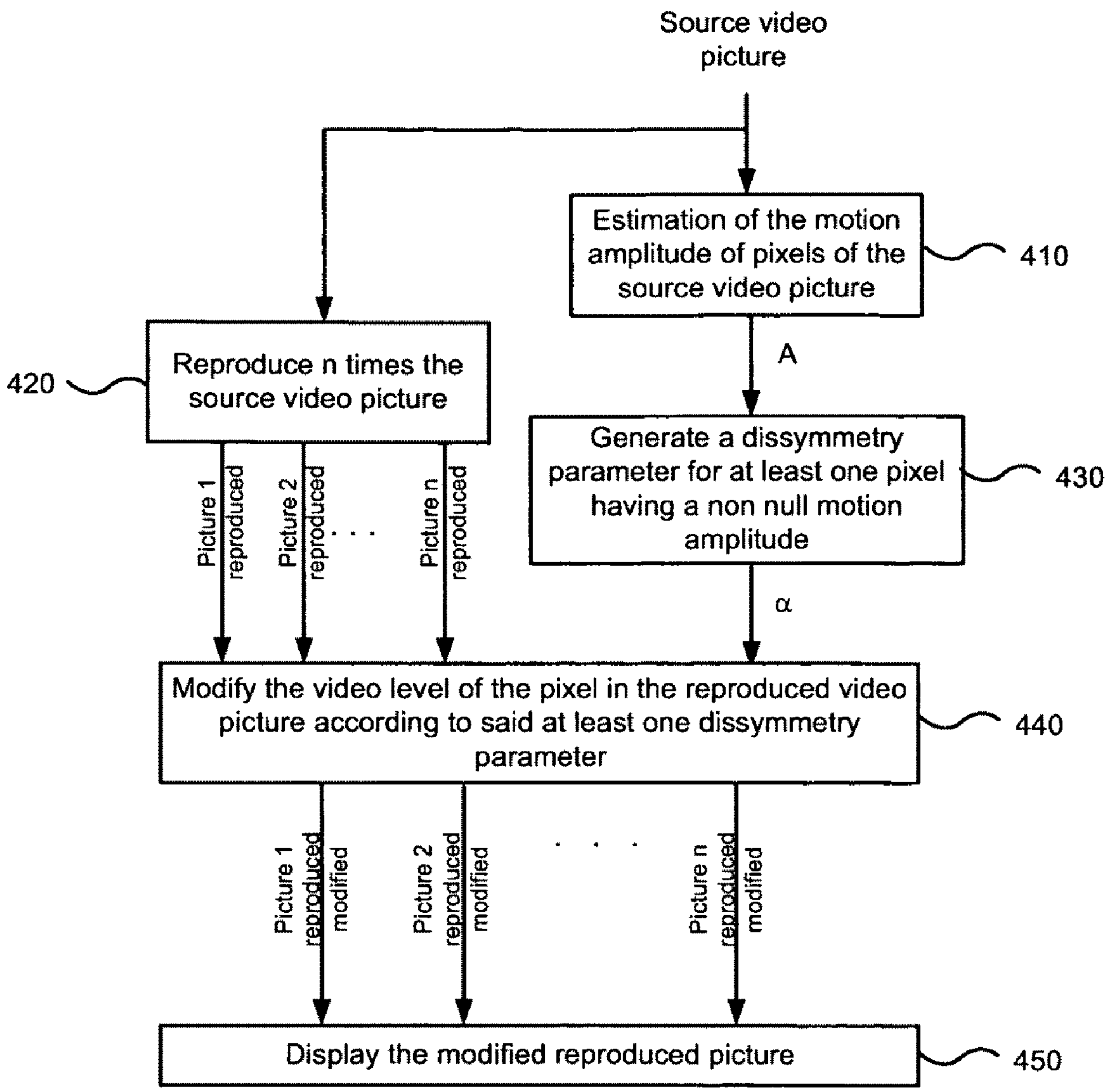
Figure 5:
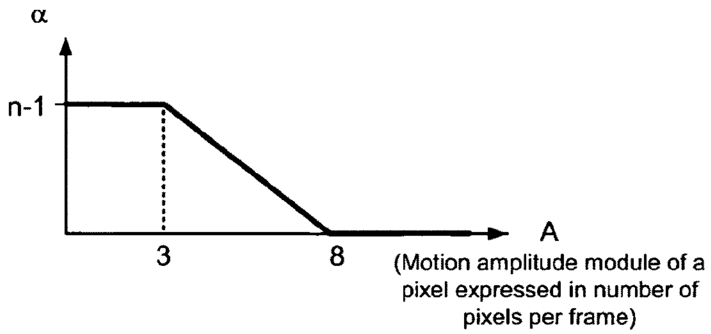
Figure 6:
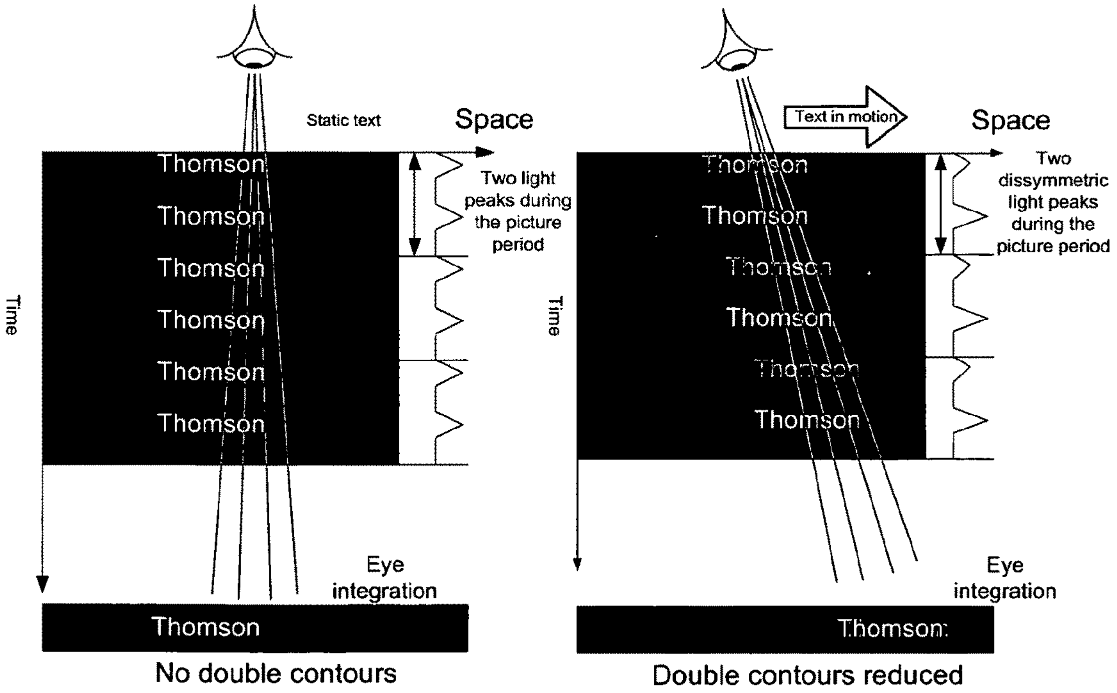
Figure 7:
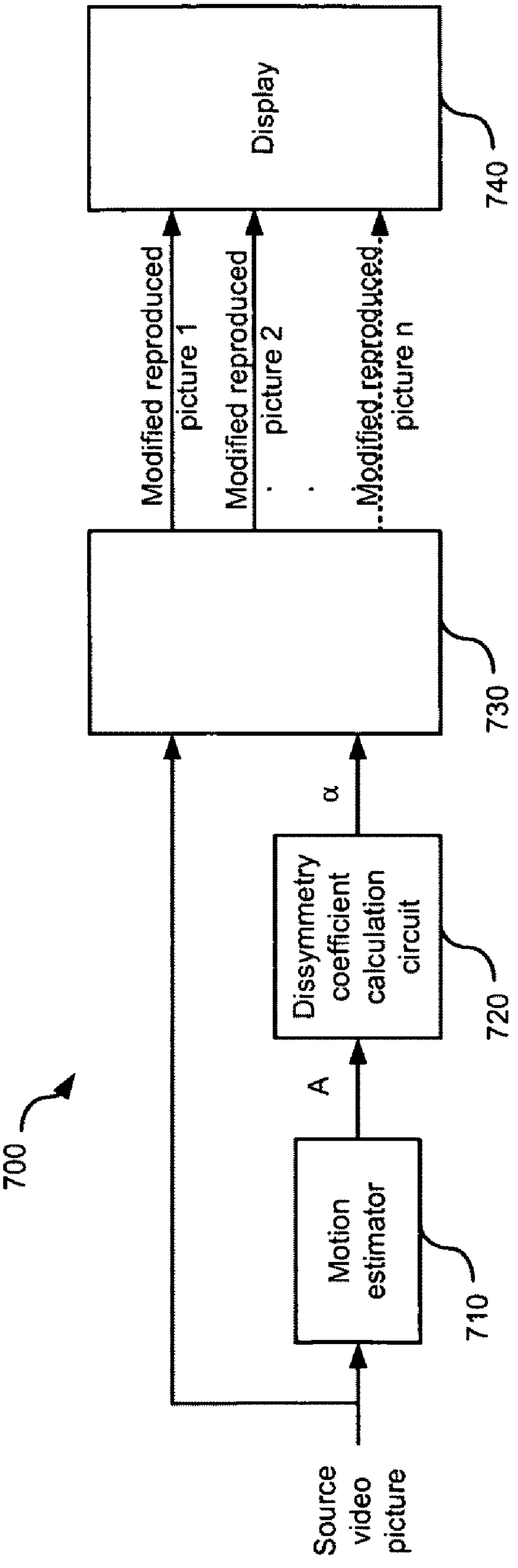

The invention will be better understood upon reading the following description, provided as a non-restrictive example and referring to the annexed drawings wherein:

FIG. 1 illustrates the blurring generated in a video picture comprising a transition between two different video levels, FIG. 2 illustrates the double contour effect generated in a video picture comprising text and displayed with a double refresh frequency, FIG. 3 illustrates a known motion compensation technique to reduce the effects of blurring and of multiple contours, FIG. 4 is a flow chart illustrating the steps of the method of the invention intended to create a video level dissymmetry, FIG. 5 shows a calculation function of a dissymmetry parameter used in the method of FIG. 4, FIG. 6 illustrates the results of the method of the invention in terms of multiple contours and blurring, and FIG. 7 represents the schema of a device implementing the method of FIG. 4.

FIG. 4 illustrates a method in accordance with the invention and intended to reduce the effects of blurring and multiple contours. The method is applied to a source video picture sequence received at a predetermined picture frequency, traditionally 50 Hz or 60 Hz.

According to a first step, with the reference 410, a motion amplitude A is estimated for at least one pixel of a source video picture. This motion estimation is carried out from the current video picture and previous video pictures and/or following pictures in the sequence. This calculation is performed by a motion estimation algorithm well known to those skilled in the art, as an example of an estimation algorithm by matching picture blocks or a recursive pixel type algorithm.

According to a next step, with a reference 420, the source video picture is reproduced n times so as to generate n reproduced video pictures, n being greater than or equal to 2. The refresh frequency that is to be used to display these reproduced pictures will also be increased n times. For a display with a refresh frequency equal to double the picture frequency of the source video pictures, two video pictures are generated for which the content is identical to that of the source video picture. These pictures are then called reproduced video pictures.

According to a step 430, from a motion amplitude module A calculated at step 410 for a given pixel of the current video picture, a dissymmetry parameter is generated, noted as $\alpha$, for said pixel. This parameter is for example equal to n−1 if the motion amplitude module A is null or very low. An example of the calculation function of the parameter $\alpha$ is illustrated by FIG. 5. In this figure, the calculation function is as follows:

$$-\text{if } |A| \le 3 \text{ then } \alpha = n-1$$

$$-\text{ if } 3 < |A| \le 8 \text{ then } \alpha = -\frac{n-1}{5}|A| + \frac{8}{5}(n-1)$$

$$-\text{ if } |A| > 8 \text{ then } \alpha = 0$$

In the case where two video pictures are reproduced from each source video picture (n=2), $\alpha$ varies between 0 and 1. More generally, in the case where n video pictures are reproduced from each source video picture, a varies between 0 and n−1.

According to a step 440, the dissymmetry parameter $\alpha$ defined in step 430 is used to modify the video level of the pixel considered in the n reproduced video pictures. The video level of the pixel is modified differently in the reproduced video pictures to create a video level dissymmetry between the reproduced pictures. In the case where n=3, one proceeds as follows: X designates the video level of the pixel considered in the source video picture and $X_1$ and $X_2$ respectively designate the video levels of the pixel considered in the first and second modified reproduced video pictures. The video levels $X_1$ and $X_2$ are calculated as follows:

if (2−α)X<255 then:

$$\begin{cases} X_1 = \alpha \cdot X \\ X_2 = (2-\alpha) \cdot X \end{cases}$$

$$\text{else } X_2 = 255 \text{ and } X_1 = 2X - 255$$

A dissymmetry is thus created equal to (2−2α)X between the two reproduced video pictures.

In the case where n=3, one proceeds as follows: X designates the video level of the pixel considered in the source video picture and $X_1$ $X_2$ and $X_3$ designate respectively the video levels of the pixel considered in the first, second and third modified reproduced video pictures. The video levels $X_1$ $X_2$ and $X_3$ are calculated as follows:

$$\text{if } (3-\alpha)X < 255 \text{ then:}$$

$$\begin{cases} X_1 = \alpha \cdot X \\ X_2 = X \\ X_3 = (3-\alpha) \cdot X \end{cases}$$

$$\text{else } X_3 = 255 \text{ and } X' = \frac{3 \cdot X - 255}{2} \text{ and}$$

$$\text{if } (2-\alpha)X < 255 \text{ then:}$$

$$\begin{cases} X_1 = \alpha \cdot X' \\ X_2 = (2-\alpha) \cdot X' \end{cases}$$

else $$\begin{cases} X_1 = 2 \cdot X' - 255 \\ X_2 = 255 \end{cases}$$

More generally (for any n greater than or equal to 2), one proceeds as follows: X designates the video level of the pixel considered in the source video picture and $X_i$ designates the video level of the considered pixel in the $i^{th}$ modified reproduced video picture. The video levels $X_1$ to $X_n$ are calculated as follows:

$$\text{if } (n-\alpha)X < 255 \text{ then:}$$

$$\begin{cases} X_1 = \alpha \cdot X \\ X_i = X & \text{for } 1 < i < n \\ X_n = (n-\alpha) \cdot X \end{cases}$$

$$\text{else } X_n = 255 \text{ and } X' = \frac{n \cdot X - 255}{n-1} \text{ and}$$

$$\text{if } (n-1-\alpha)X' < 255 \text{ then:}$$

$$\begin{cases} X_1 = \alpha \cdot X' \\ X_i = X' & \text{for } 1 < i < n-1 \\ X_{n-1} = (n-1-\alpha) \cdot X' \end{cases}$$

$$\text{else } X_{n-1} = 255 \text{ and } X'' = \frac{(n-1) \cdot X' - 255}{n-2} \text{ and}$$

$$\text{if } (n-2-\alpha)X'' < 255 \text{ then:}$$

-continued $$\begin{cases} X_1 = \alpha \cdot X'' \\ X_i = X'' & \text{for } 1 < i < n-2 \\ X_{n-2} = (n-2-\alpha) \cdot X'' \end{cases}$$

and so on until all the $X_i$ are defined.

In reference to step 450, the n reproduced pictures thus modified are then displayed at a refresh frequency equal to n times the picture frequency of the source video picture.

Hence, according to the invention, a video level dissymmetry is generated only for the pixels of the areas in motion of the video picture to be displayed. FIG. 6 illustrates the results of the method in terms of blurring and double contours. In these two pictures, the picture displayed is the word "Thomson" written in grey on a black background.

FIG. 6 illustrates the case where the refresh frequency is doubled. In the left part of the figure, the text "Thomson" is static. The picture is reproduced twice without creation of dissymmetry. Two identical peaks of light thus appear during the frame period due to the double refresh frequency. In the right part of the figure, the picture is reproduced twice but the video level of the word "Thomson" is reduced in the first reproduced video picture and increased in inverse proportions in the second reproduced video picture, the average video level over the two reproduced video pictures being equal to the video level of this word in the source video picture. A video level dissymmetry is thus created between the reproduced video pictures. In this example, for an average video level equal to 128 (=video level in the source video picture), for example a video level of 64 for the first reproduced video picture and a video level of 192 for the second reproduced video picture is displayed. As can be seen at the bottom of FIG. 6, the double contours effect disappears or is greatly reduced in the areas in motion of the source video picture. In terms of flicker, there is none in the static areas of the picture and, in the areas in motion, it is hardly perceived by the eye due to motion.

This method can be illustrated by the following examples:

EXAMPLE 1

A pixel having a video level X equal to 96 moves by 4 pixels per picture period. 2 video pictures are produced per picture source (n=2). Then α=0.8. The video level $X_1$ of the pixel in the first modified reproduced video picture is then equal to 0.8×96=76 and the video level $X_2$ of the second modified reproduced video picture is then equal to 1.2×96=116.

EXAMPLE 2

A pixel having a video level X equal to 224 moves by 4 pixels per picture period. 2 video pictures are produced per picture source (n=2). Then α=0.8. Like (2−α)·224>255, the video level $X_2$ of the pixel in the second modified reproduced video picture is then taken to be equal to 255 and the video level $X_1$ of the pixel in the first modified reproduced video picture is then taken to be equal to 2×224−255=193.

EXAMPLE 3

A pixel having a video level X equal to 195 moves by 10 pixels per picture period. 3 video pictures are produced per picture source (n=2). Then α=0. As (3−α)·195>255 and as 2X'=330>255, the video level $X_3$ of the pixel in the third modified reproduced video picture is then taken to be equal to 255, the video level $X_2$ of the pixel in the second modified reproduced video picture is also taken to be equal to 255 and the video level $X_1$ of the first modified reproduced video picture is taken to be equal to 330−255=75.

In the method and examples previously described, the light produced by the pixel is concentrated on the last reproduced video picture ($n^{nth}$ reproduced video picture in the temporal domain) and on its neighbours. Naturally, provision can be made to concentrate this light on the first reproduced picture and its neighbours or on an intermediate picture and its neighbours. Likewise, the symmetry parameter α provided as an example diminishes as the motion amplitude module A increases. Naturally, a completely different parameter can be selected. The main condition is that, at a constant video level, the dissymmetry increases as the motion amplitude module increases.

FIG. 7 illustrates a device 700 capable of implementing the method of the invention. The device 700 receives the source video pictures. It comprises a motion estimator 710 to estimate the motion amplitude A of the pixels of a source video picture. This motion estimation is carried out from the current video picture and previous video pictures and/or following pictures in the sequence. This estimator implements for example an estimation algorithm by matching picture blocks or a recursive pixel type algorithm. The motion estimator can possibly be coupled to a detection circuit of static areas that has the advantage of detecting, in a manner more reliable than a motion estimator, the static areas in the source video picture. In these areas, no dissymmetry will be generated between the different reproduced video pictures.

The device 700 also comprises a calculation circuit 720 of the dissymmetry parameter α previously defined in step 430 of the method of the invention. This parameter is calculated for each pixel of the source video picture. It is defined from the motion amplitude A estimated for the considered pixel. This parameter is calculated as indicated in FIG. 5.

The device 700 also comprises a circuit 730 capable of reproducing n times the source video picture at the input of the device in such a manner to generate n reproduced video pictures, n being greater than or equal to 2. The refresh frequency that is to be used to display these reproduced pictures will also be increased n times. The circuit 730 also modifies the video level of the considered pixel in the n reproduced video pictures according to the dissymmetry parameter α calculated by the circuit 720 for the considered pixel in such a manner to create a video level dissymmetry between the reproduced pictures as described previously at step 440. The n reproduced pictures modified by the circuit 730 are then displayed by a display 740 at a refresh frequency equal to n times the picture frequency of the source video picture.

Naturally, the invention is not limited to the aforementioned embodiments.

In particular, those skilled in the art will be able to use a calculation function of the dissymmetry parameter α different from the one presented in FIG. 5. Notably, they will be able to vary the inclination of the function. They can also use more than one dissymmetry parameter and/or modify the calculation formulae of the video levels $X_i$ in the reproduced video pictures.

The invention claimed is:

1. Method for displaying at least one source video picture of a video sequence, a source display frequency being associated with said source video picture, wherein it comprises the following steps:

estimate the pixel motion of said source video picture, reproduce n times said source video picture in such a manner as to generate n reproduced video pictures, n being an integer greater than or equal to 2, modify said n reproduced video pictures in such a manner as to generate, for at least one pixel of the source video picture having a non-null motion amplitude, a dissymmetry between the video level of said pixel in at least one first reproduced video picture and the video level of said pixel in at least one second reproduced video picture, the average video level of said pixel in the n reproduced video pictures being noticeably equal to the video level of said pixel in the source video picture, and the dissymmetry generated between the video level of said pixel in said at least one first reproduced video picture and the video level of said pixel in said at least one second reproduced video picture depending on the video level of said pixel in the source video picture and the estimated motion for said pixel, and display said n reproduced video pictures with a display frequency equal to n times the display frequency associated with the source video picture.

2. Method according to claim 1, wherein, to generate, for at least one pixel of the source video picture having a non-null amplitude of motion, a dissymmetry between the video level of said pixel in at least one first reproduced video picture and the video level of said pixel in at least one second reproduced video picture, a dissymmetry parameter is defined for said pixel from the estimated motion amplitude module for said pixel and the video level of said pixel is modified in said first and second reproduced video pictures being based on said dissymmetry parameter.

3. Method according to claim 1, wherein, for a given pixel, the dissymmetry increases as the estimated motion amplitude module for said pixel increases.

4. Method according to claim 1, wherein, the source display frequency associated with the source video picture is 50 Hz and the reproduced video pictures are displayed at a frequency equal to 100 Hz, n then being equal to 2.

5. Method according to claim 1, wherein, the source display frequency associated with the source video picture is 60 Hz and the reproduced video pictures are displayed at a frequency equal to 120 Hz, n then being equal to 2.

6. Device for displaying at least one source video picture of a video sequence, a source display frequency being associated with said source video picture, wherein it comprises:

a motion estimator to estimate the pixel motion of said source video picture, a reproduction and processing circuit to reproduce n times said source video picture in such a manner as to generate n reproduced video pictures, n being an integer greater than or equal to 2 and to modify said n reproduced video pictures in such a manner as to generate, for at least one pixel of the source video picture having a non-null motion amplitude, a dissymmetry between the video level of said pixel in at least one first reproduced video picture and the video level of said pixel in said at least one second reproduced video picture, the average video level of said pixel in the n reproduced video pictures being noticeably equal to the video level of said pixel in the source video picture, and the dissymmetry generated between the video level of said pixel in said at least one first reproduced video picture and the video level of said pixel in said at least one second reproduced video picture depending on the video level of said pixel in the source video picture and the estimated motion for said pixel, and a display to display said n reproduced video pictures with a display frequency equal to n times the display frequency associated with the source video picture.

7. Device according to claim 6, wherein, the reproduction and processing circuit comprises a calculation circuit to calculate a dissymmetry parameter for said pixel from the motion amplitude module estimated for said pixel, the video level of said pixel in said first and second reproduced video pictures then being modified by the reproduction and processing circuit based on said dissymmetry parameter.

* * * * *